United States Patent Office 3,190,560
Patented June 22, 1965

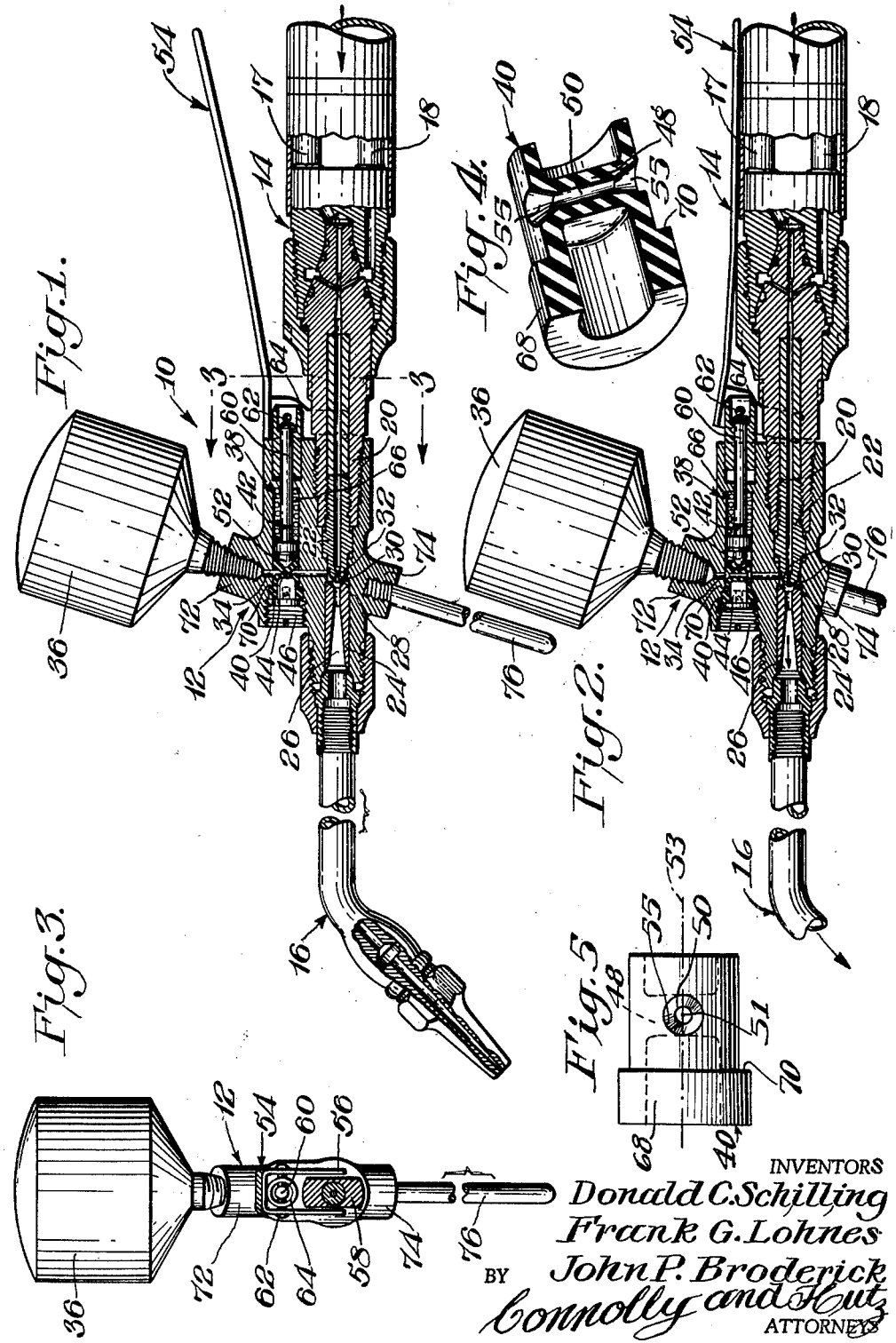

3,190,560
FLAME-SPRAYING TORCH
Donald C. Schilling, Fairview Park, Ohio, and Frank G. Lohnes, Glen Cove, and John P. Broderick, Bayside, N.Y., assignors to Eutectic Welding Alloys Corporation, Flushing, N.Y., a corporation of New York
Filed June 7, 1963, Ser. No. 286,343
4 Claims. (Cl. 239—85)

This invention relates to a torch for flame spraying coatings upon surfaces, and it more particularly relates to such a torch for spraying coatings from metal powders upon metal surfaces.

When injecting powders into the stream of burning gas emitted from a gas torch for coating and fusing them upon a surface, the control or metering of the quantity of powder entering the stream of gases is highly critical. The maintenance of such control over an extended period of use is also complicated by the abrasive nature of the powders being fed. In a torch which depends upon gravity for feeding the powders into the stream the disposition of the powder container is also an important consideration.

An object of this invention is to provide a simple, economical and dependable form of control valve for a powder-feeding flame-spraying torch.

Another object is to provide such a valve which is conveniently replaceable, and A further object is to provide an efficient aligning structure for a gravity-feeding flame-spraying torch.

In accordance with this invention a valving passageway intersects the powder supplying conduit within the powder injecting section of the torch. This passageway extends through a wall of the section, and an insert of elastomeric material is secured in the passageway between a securing plug and a valve-actuating plunger. The pressure applied by the stem and plug on opposite sides of a channeled bridge within the insert precisely controls the amount of powder flowing through the channel. The valve insert can easily be installed and replaced by removal of the plug, and it is secured with its channel aligned with the powder-supplying conduit by engagement of an enlarged head against a shoulder within the valving passageway.

The powder container is maintained substantially vertical during operating conditions by slightly inclining a boss for mounting the powder container on top of the injecting section backwardly from the vertical thereby maintaining it substantially vertically oriented when the tip of the torch is inclined downwardly in its normal operating position. A similar boss on the bottom of the torch inclined forwardly and substantially parallel to the upper boss provides a convenient holding fixture for maintaining the powder container substantially vertically oriented during operation.

Novel features and advantages of the present invention will become apparent to one skilled in the art from a reading of the following description in conjunction with the accompanying drawings wherein similar reference characters refer to similar parts and in which:

FIG. 1 and FIG. 2 are cross-section views in elevation of one embodiment of this invention in respectively shut-off and operating conditions;

FIG. 3 is a cross-sectional view taken through FIG. 1 along the line 3—3;

FIG. 4 is a partial cross-sectional view of the valve insert portion of the embodiment shown in FIGS. 1 and 2; and FIG. 5 is a top plan view of the valve insert portion shown in FIG. 4.

In FIGS. 1 and 2 is shown a flame-spraying torch 10 having a powder injecting section 12 inserted between a gas injecting handle 14 and a tip section 16. Gas injecting assembly 14 is for example substantially of the standard gas welding or cutting torch type, and it is for example of the oxyacetylene variety. It includes, for example conduit 17 for oxygen and conduit 18 for acetylene and suitable mixing means. The nose 20 of gas injecting handle 14 is connected to powder-injecting section 12 for example being threaded within it, and nose 20 terminates in an injector nozzle 22. A tubular nozzle 24 having an expanding outlet passageway 26 is inserted within powder injecting section 12 in front of injector nozzle 22 a short distance therefrom for receiving the mixture of gases discharged from injector nozzle 22. The concave rear wall 28 of tubular nozzle 24 is spaced a short distance from the convex front wall 30 of injector nozzle 22 to provide a powder-entraining space 32 between them to which powder supply conduit 34 extending upwardly through powder-injecting section 12 is connected. Powder supplying container 36 is connected to the top of supply conduit 34. Valving passageway 38 extends longitudinally through an upper portion of section 12, and it intersects powder supplying passageway 34 for controlling the amount of powder flowing through it as later described.

A valve insert 40, shown in detail in FIG. 4, is inserted within valving passageway 38 between a manually actuated valve plunger 42 and an abutment 44 upon plug 46. As shown in FIG. 4, insert 40 is for example substantially tubular and made of elastomeric material. It includes a vertical bridge section 48 through which a vertically disposed powder metering channel 50 extends. Channel 50 as shown in FIG. 5 is elliptical in cross section, and its minor axis 51 is disposed substantially parallel to the line of action 53 of plunger 42. Channel 50 includes funnel shaped outer sections 55. The pressure of opposed plug abutment 44 and the curved nose 52 of valve plunger 42 reacting against bridge section 48 accordingly closes channel 50 to an extent which governs the amount of powder running through it or entirely closes it.

A manual operating lever assembly 54 is connected to injecting section 12 by a spring fork 56 shown in FIG. 3 resting about an intermediate section 58 of gas injecting handle 16. Lever assembly 54 is connected to valving stem 60 by pin 62 and coupling 64. A spring 66 within valving passageway 38 reacts against stem 60 in a direction to force nose 52 of valve piston means 42 in a channel closing direction.

Installation and replacement of valve insert 40, which is for example, made of rubber such as neoprene of approximately 45 durometer, is facilitated by removal and replacement of threaded plug 46. The alignment of channel 50 in insert 40 is facilitated by engagement of its enlarged head 68 with corresponding shoulder 70 within the portion of valving passageway 38 adjacent plug 46.

The backward inclination of upper boss 72, which supports powder container 36 threaded into it on the top of powder injecting section 12 at an angle of approximately 15° to the vertical, maintains the powder container and its powder supplying passageway disposed in an efficient vertical position when the torch is held at a slightly inclined position during its normal operation.

The substantially parallel forward inclination at the same angle to the vertical of lower boss 74 on the bottom of powder-injecting section 12 provides a convenient mode of connecting various holding fixtures, such as rod 76 threaded within it, for maintaining the torch conveniently disposed in its most effective operating position.

What is claimed is:

1. A flame-spraying torch comprising a gas injecting assembly having connecting means for attachment to a source of combustible gas, a tip section connected to the front of said torch, a powder injecting section connected between said tip section and said gas injecting assembly for entraining powder within the burning gases discharged from said torch, a longitudinal gas-conducting passageway through said powder injecting section, powder supplying passageway extending through said powder injecting section into communication with said gas-conducting passageway, means for connecting a supply of powder upon said powder injecting section at the outer end of said powder supplying passageway, a valving passageway extending through said powder injecting section intersecting said powder supplying passageway, a valve insert of elastomeric material inserted within the portion of said valving passageway that intersects said powder supplying passageway, said insert including a bridge having a channel disposed in line with said powder supplying passageway, a plug securing said valve insert within said valving passageway and having an abutment disposed adjacent said channeled portion of said valve insert, manually-actuated plunger means disposed in said valving passageway adjacent the side of said channeled bridge of said valve insert remote from said abutment for controllably squeezing said channel together in conjunction with said abutment thereby metering the amount of powder passing through said powder supplying passageway, and said plug being removable to facilitate installation and replacement of said valve insert.

2. A torch as set forth in claim 1 wherein said valve insert is comprised of a tubular section having said channeled bridge disposed within an intermediate portion thereof.

3. A torch as set forth in claim 2 wherein a head is provided upon the portion of said insert adjacent said plug, said valving passageway including a shoulder, and said head being secured between said shoulder and said plug to fasten said valve insert securely in place with said channel aligned with said powder-supplying passageway.

4. A torch as set forth in claim 1 wherein said channel is elliptical in cross section with its minor axis disposed parallel to the line of action of said plunger means.

References Cited by the Examiner
UNITED STATES PATENTS

| | | | |
|---|---|---|---|
| 1,756,381 | 4/30 | Pahl | 239—85 |
| 2,786,779 | 3/57 | Long et al. | 239—85 |
| 2,794,677 | 6/57 | Collardin et al. | 239—85 |
| 2,957,630 | 10/60 | Lamb | 239—85 |
| 2,961,335 | 11/60 | Shepard | 239—85 |
| 3,096,199 | 7/63 | Lamb | 239—85 |

FOREIGN PATENTS

| | | |
|---|---|---|
| 1,087,688 | 8/54 | France. |
| 730,654 | 5/55 | Great Britain. |

EVERETT W. KIRBY, *Primary Examiner.*